Patented Mar. 28, 1939

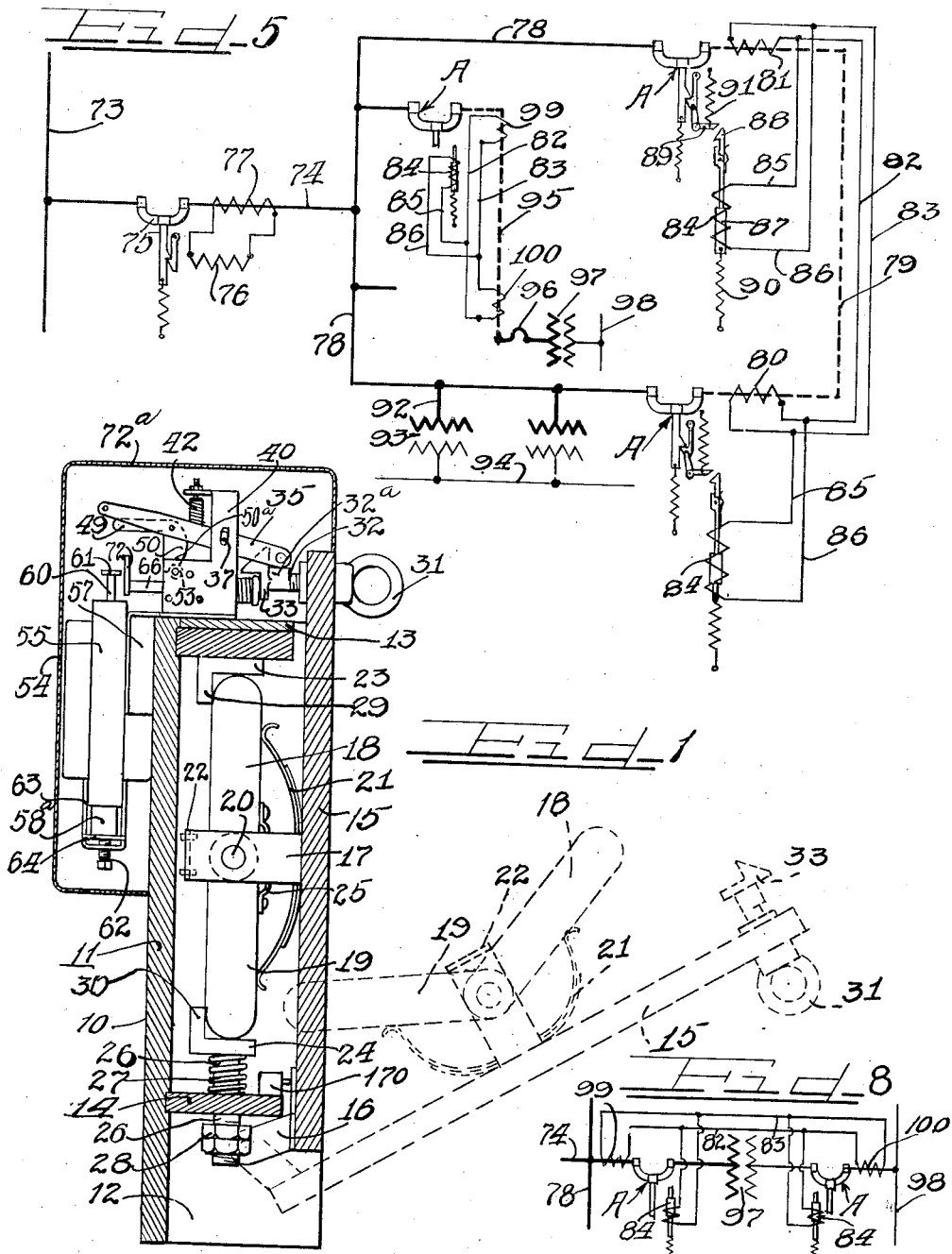

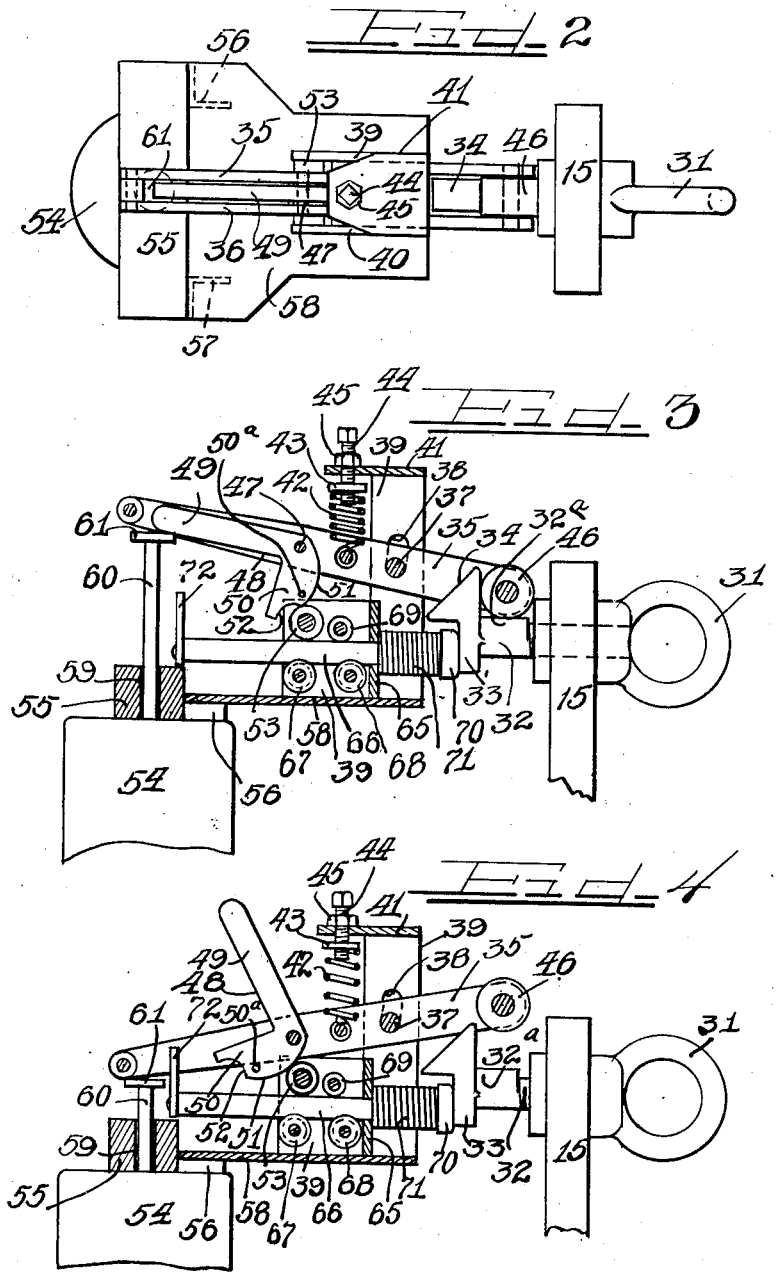

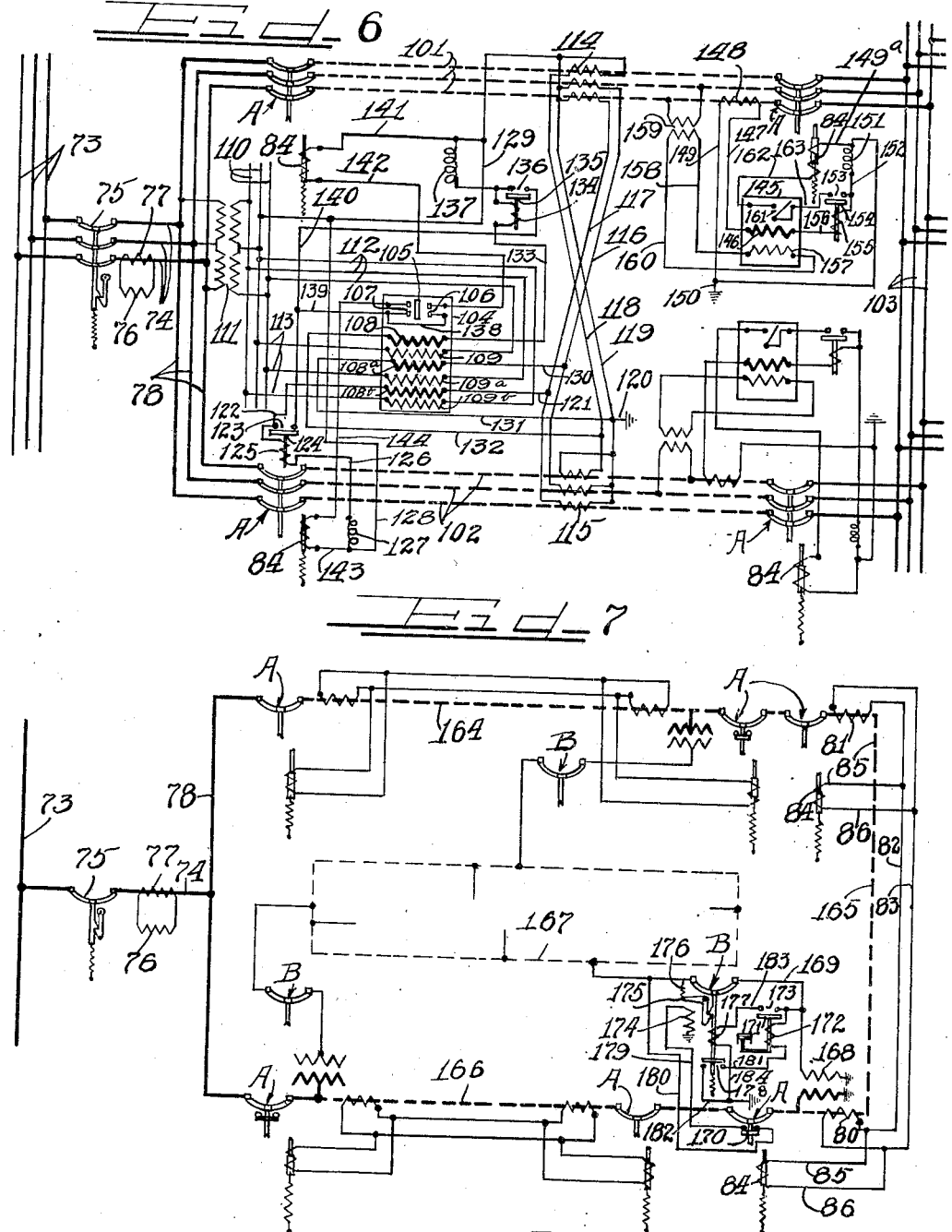

2,152,445

UNITED STATES PATENT OFFICE 2,152,445

DISTRIBUTION SYSTEM

Joseph J. Shoemaker, Pleasant Ridge, and Howard P. Seelye, Royal Oak, Mich., assignors, by mesne assignments, to Westinghouse Electric & Manufacturing Company, East Pittsburgh, Pa., a corporation of Pennsylvania Application January 24, 1935, Serial No. 3,225

19 Claims. (Cl. 175—294)

This invention relates in general to alternating current distribution systems, and is more particularly concerned with improved switching means therefor.

In the usual type of distribution system, utilizing a sectionalized loop, it has in the past been the custom to provide sectionalizing switches in the form of circuit breakers which are arranged so as to isolate a faulty section by opening during the flow of fault current. Such operation necessitates that the circuit breakers have sufficient interrupting capacity to open the fault current, thereby not only necessitating the use of an expensive device, but in addition requiring the use of auxiliary relay equipment, etc., for controlling the operation of the circuit breakers.

With the foregoing in mind, the present invention seeks to provide an economical system, wherein the expensive circuit breakers and auxiliary devices may in a large measure be dispensed with, and in which switches of the disconnecting type having litle or no interrupting capacity may be used. In the novel switch to be hereinafter described, novel switching means are provided, whereby the opening of the switch contacts is delayed until the circuit in which the switches are disposed is de-energized.

It is an object of the present invention to provide a switch having improved actuating means which functions to trip the switch upon current flow changes from its normal amount or direction, but which will maintain the switch contacts closed until current ceases to flow, due to the circuit being de-energized elsewhere.

It is a further object of the present invention to provide in a switch of the character described, means to pre-set the switch for the tripping operation upon current flow changes, but which does not function to open the switch contacts until the current ceases to flow.

Another object of the invention is to provide improved means for sectionalizing a feeder, wherein a short circuited section of the feeder will be automatically cut out in response to the deenergization of the feeder, thus enabling the immediate re-establishment of service by energizing the remaining sections.

It is also an object of the invention herein described to provide in connection with a sectional feeder, means for selectively pre-setting the sectionalizing switches of a section having an abnormal condition therein, and which will operate upon the deenergization of the feeder to open the contacts of the pre-set switches only, whereupon the remaining sections may again be energized.

Still another object of the invention is to provide selective means for disconnecting one of a plurality of parallel feeders upon the occurrence of an abnormal condition therein, and in which the disconnection of the selected feeder will be delayed until the feeders are deenergized relative to a supply source, and which will permit the reenergization of the remaining feeders to re-establish the service.

Other objects of this invention will more fully appear from the following detailed description taken in connection with the accompanying drawings, which illustrate several embodiments thereof, and in which:

Figure 1 is a vertical sectional view through the housing of a switch utilized in the present invention, this view showing the operative relationship of the switch parts, when the switch is in normal closed position;

Figure 2 is a plan view of the tripping and latching mechanisms of the switch;

Figure 3 is an enlarged fragmentary sectional view of the tripping and latching mechanism, illustrating the relative positions of the parts just after the switch has been pre-set, and prior to the latch releasing operation;

Figure 4 is a similar view showing the operative relationship of the parts when the latch is released, and just before the switch door has opened to open the switch contacts;

Figure 5 is a schematic wiring diagram showing a distribution system and illustrating an application of the present invention;

Figure 6 is a schematic wiring diagram of another type of distribution system utilizing switches of the hereindescribed character;

Figure 7 diagrammatically illustrates another type of distribution system and the manner in which the switches may be utilized therein; and Figure 8 diagrammatically illustrates an arrangement wherein the switches of the present invention may be utilized to trip out a feeder and its transformer upon the occurrence of abnormal conditions therein.

As shown on the drawings:

Referring to Figure 1, the illustrated embodiment discloses the swiнch as comprising a box-like structure, generally indicated at 10, which is formed by a back member 11, a pair of side members 12—12 (only one being shown), and top and bottom members 13 and 14, respectively. The box is open on its forward side and is arranged to be closed by means of a cover 15 which is inwardly secured to the side members 12—12 by means of hinge brackets 16.

It will be observed that the bottom 14 is upwardly spaced from the lowermost edges of the back and side walls of the box, and that the hinge brackets of the cover are pivoted to the side walls at a point below the bottom 14. With this arrangement, when the box cover is swung to open position, it may assume a natural hanging position below the box.

Mounted centrally in the middle of the cover or door 15 of the box is a bracket 17 which projects rearwardly from the door at substantially right angles thereto to form a support for a pair of pivotally mounted switch blades 18 and 19 which are oppositely disposed relative to a pivotal connection 20.

Between the switch blades 18 and 19 and the rear face of the door, there is mounted a leaf spring 21 which is arranged with its free ends bearing against the respective switch blades and normally tending to cause the outer ends of the blades to be moved away from the rear face of the door. This movement of the switch blades is limited by means of a stop which is formed by a plate 22 secured at the outer end of the bracket 17. The switch blades form a movable bridging contact which is moved out of and into bridging relation with an upper stationary contact 23 and a lower yieldingly mounted contact 24 by opening and closing the door of the switch box.

The switch blades are interconnected by means of a flexible jumper 25. The upper and lower contacts are respectively supported on the top and bottom of the box. The lower contact is provided with a threaded stem 26 which is supported for axial movement in the bottom 14. A compression spring 27 surrounds the stem 26, one end of this spring bearing against the contact head and the other end against the bottom 14, whereby the tendency of the contact is to move upwardly. Upward movement of the contact by the spring is limited by nuts 28—28 on the stem below the bottom member 14.

In Figure 1, there is shown in dotted lines, the positions assumed by the switch blades 18 and 19 when the door is in open position. The blades are angularly disposed, and rest against the stop 22. If the door is now closed, the ends of the blades engage deflected portions 29 and 30 of the upper and lower contacts respectively, these portions serving as stops, so that as the door 15 is moved into fully closed position, the blades are moved into axial alignment, with the result that the blades function as a toggle and are forced against the contacts 23 and 24.

The door 15 is manually operable to closed position and is provided with a pull ring 31 which is adapted to receive an operating switch hook. Threaded into the body portion of the pull ring is a stem 32 having a head portion 33 which is extended outwardly beyond the stem and shaped to form a cam surface 34. Adjacent the head 33, the stem is provided with an upwardly extending boss 32a, the purpose of which will shortly be evident. Cooperatively associated therewith is a pair of spaced arms 35 and 36 which are secured together to form a latching lever. This lever is provided intermediate its ends with a trunnion 37, the ends of which are supported in aligned elongated arcuate openings 38 respectively disposed in the spaced legs 39 and 40 of a U-shaped bracket 41.

A compression spring 42 is connected at one end to the latching lever and at its other end bears against a plate 43 on a stem 44 which is threaded into the bracket 41 for axial movement, to enable the adjustment of the pressure exerted by the spring. The stem 44 may be locked in adjusted position by means of a lock nut 45. It will be observed that the compression spring is off center relative to the pivotal support of the latching lever and so disposed that there is a tendency for the latching lever to be rotated about the trunnion 37 in a counter-clockwise direction. The forward end of the latching lever is provided with a roller 46 for cooperation with the cam surface 34 of the head 33.

Pivotally mounted on a pivot pin 47 for swinging movement between the arms 35 and 36 is a trigger 48 having arms 49 and 50 which are substantially at right angles to each other. The arm 50 has one end thereof formed as a cam surface 51 which terminates near the end of the arm 50 in a swell 52.

The arm 50, when the switch is in closed position, is disposed so that the swell 52 engages a roller 53, as shown in Figure 1. In this position, the arm 50 opposes the counter-clockwise movement of the latching arm under the influence of the compression spring 42 to unlatch the door. Also, when the arm 50 is so disposed, the arm 49 projects slightly below the associated end of the latching lever.

Mounted on the rear surface of the switch box is a tripping coil 54 which is surrounded by a frame 55. This frame is secured to a pair of spaced angle iron legs 56 and 57 which depend from a base plate 58 upon which the bracket 41 is mounted.

The lower side of the coil supporting frame is apertured to receive a solenoid core 58a and the upper side is apertured as shown at 59 to receive a stem 60 which is connected to and movable with the solenoid. The upper end of the stem 60 carries an abutment plate 61. The pick-up point of the solenoid is adjusted by means of adjusting screw 62 which is threadedly supported in a stirrup 63 which is secured to the frame 55. Associated with the screw 62 is a plate 64 which forms a seat for the solenoid, and which may be raised or lowered by means of the screw to vary the pick-up point of the solenoid.

Interconnecting the legs 39 and 40 of the bracket 41 is a web 65 which is apertured to receive a rod 66 for axial movement. The rod is guided by means of guide rollers 67, 68 and 69. The forward end of this rod is provided with a head portion 70 which is held in abutment with the head 33, when the door of the switch is closed, by means of an expansive spring 71 having one end bearing against the head 70 and its other end bearing against the web 65.

The other end of the rod 66 carries an outwardly projecting plate 72 which is arranged to contact the outer end of the arm 50 of the trigger, when the rod 66 is permitted to move under the influence of spring 71, by opening the switch door.

Referring to Figures 1 to 4 inclusive, the operation of the tripping and latching mechanism will be explained.

With the switch in closed position, the latching and tripping mechanism will be as shown in Figure 1, the latching lever being locked against movement to release position by the trigger 48, since the swell 52 is in engagement with the roller 53.

Assuming that the coil 54 is now energized by connecting it to an electric circuit, the solenoid 58a picks up and the abutment plate 61 strikes the arm 49 of the trigger and rotates the same in a clockwise direction to bring the arm 50 to such a position that the roller 53 is in engagement with the cam surface 51. So long as the coil is energized, the solenoid will oppose and will supersede the action of the trigger in opposing movement of the latching lever to release position, as the plate 61 also engages the associated arm of the latching lever, as shown in Figure 3.

Referring to Figure 4, it will be observed that when the coil is de-energized, the solenoid drops and permits the counter-clockwise movement of the latching lever under the influence of the spring 42 about its trunnion 37 as a pivotal axis. This movement of the latching lever to release position causes the roller 46 to disengage the head 33 and at the same time, the engagement of the cam surface 51 on the trigger causes the trigger arm 49 to assume a position substantially at right angles to and above the associated end of the latching lever. Movement in this direction is arrested by a stop pin 50a.

As soon as the head 33 is released, the expansion spring 71 moves the rod 66 to the right, as viewed in Figure 4, to automatically open the door of the switch box to disengage the switch contacts. As soon as the door is released, and kicked outwardly by the action of spring 71, it continues by virtue of gravity to assume a depending position below the box. Simultaneously with this action, the plate 72 will be moved into engagement with the outer end of arm 50 and will rotate the arm in a counter-clockwise direction. This movement and the action of the cam surface 51 on the roller 53 will reset the latching lever to normal position, as shown in Figure 1.

The switch may be re-closed and latched in closed position by simply manually closing the door of the switch. As the door comes to fully closed position, the cam surface 34 engages the roller 46 and raises the roller, the latching lever in this case being pivotally rotated about the pivot 47 a limited amount as determined by the length of the arcuate openings 38. As soon as the door has seated, the roller will drop behind the head 33 striking the boss 32a and latch the door in closed position. The boss 32a is of such height that it will prevent lever 35 from pivoting about 37 when the roller 46 is at its lowermost position, and also prevents the lever 35 from kicking up when the door 15 is closed. Such kicking would tend to release the trigger arm 50. The entire tripping and latching mechanism is enclosed within a suitable housing 72a.

In Figure 5, there is shown a distribution system which includes a primary source of supply, as 73, which represents a sub-station bus. Connected to this bus is a feeder 74 in which is mounted a main circuit breaker 75. This circuit breaker is arranged to trip on overload, and is provided with a trip coil 76 which is connected in the usual manner to a current transformer 77. The feeder 74 may be an underground cable or overhead main and is connected to an overhead main 78 which, in this instance, has its ends connected through switches such as described in connection with the present invention to a bridging underground cable 79, whereby a primary loop is formed, this loop having an underground section of cable which it is desirable to protect against internal short circuit.

In the usual arrangement, either expensive sectionalizing circuit breakers would be used, which would necessitate expensive auxiliary devices, such as relays, etc.; or in order to cut down the cost, hand operated switches would be used, which require considerable time to operate and cause objectionably long interruption of the entire circuit in case of a cable fault. In the present scheme using switches A, current transformers 80 and 81 are placed at the ends of the cable 79, these current transformers being connected by means of conductors 82 and 83 in such a manner that, when current flows through the current transformers in the same direction, there will be opposing potentials in the conductors 82 and 83. As soon, however, as there is a short circuit in the cable lying between the current transformers, current will flow in opposite directions through the current transformers, and a potential will be built up between the conductors 82 and 83. Advantage is taken of this fact to provide tripping potential for the trip coils 84 of switches A. These trip coils are connected across conductors 82 and 83 by conductors 85 and 86 in each case.

When a short circuit occurs on the cable, the operation of the switches A is as follows:

The coil 84 being energized picks up the solenoid 87 to cause a spring latch 88 to engage a tripping latch 89. So long, however, as the coil 84 is energized, the switches A will not be tripped. The short circuit on the cable will cause the circuit breaker 75 to trip out on overload and the primary loop will be de-energized, with the result that the trip coils 84—84 of the switches A will likewise be de-energized. This enables a spring 90 to actuate the solenoid in such a direction as to trip the switches A. As soon as the switches have been tripped, a spring 91 will return the tripping latch to normal position, so that when the switch is re-closed it will be latched in closed position.

It will, therefore, be seen that the tripping of switches A, to isolate the bridging cable, will not take place until after the primary circuit has been de-energized in response to tripping the main circuit breaker 75. Consequently, the switches A do not have to interrupt the fault or load current and consequently do not have to be designed so as to have interrupting capacity characteristics. These switches may, therefore, be constructed at materially less cost than in the case of oil circuit breakers for a similar purpose.

As soon as the faulty cable has been cut out, the main circuit breaker 75 may be re-closed in any of the usual ways, such as by an electric operating means, or by automatic re-closing equipment. The primary feeder 74 being energized, the primary main 78 may again re-establish service to branch feeders such as 92, which feed through step-down transformers 93 to energize a utilization circuit 94, which may be a low voltage network.

The switch A, such as described herein, may also be used for disconnecting a branch feeder such as shown at 95 from the primary loop. In this case, as shown in Figure 5, the feeder 95, which may be an underground cable, is connected through a fuse 96, step-down transformer 97 to a utilization circuit 98 which may be a network fed from other sources than the sub-station bus 73. Current transformers 99 and 100 are provided at the ends of the cable 95, the same as in the case of the bridging cable 79, and the tripping coil of the switch is connected in the same manner, and the tripping mechanism of the switch A in this case operates in the same manner, as previously described, upon a short circuit in the cable 95.

In Figure 8, a slightly different arrangement is shown for protecting the feeder 95. In this case switches A are placed on both the primary and secondary sides of the transformer 97 and the trip coils of these switches connected to the connections 82 and 83 of the differentially connected transformers, so that upon the occurrence of trouble in the transformer 97 or the connecting cables thereof to the switches A, the switches A will be tripped to open the feeder as soon as the station breaker has opened.

Referring to Figure 6, the application of the switches such as described herein is shown, where it is desired to selectively cut out one of a pair of parallel feeders, such as 101 and 102, upon a short circuit in one of the feeders. In this case, the feeders are shown as being connected to a distribution bus 103.

Switches A are placed at the supply ends and delivery ends of the parallel feeders. The switches at the supply ends of the feeders are selectively tripped by a differential relay 104 having a bridging contact 105 which is adapted to close a set of contacts 106 or 107 to trip one switch or the other, depending upon which parallel feeder is carrying excess current. The differential relay is designed for three phase protection, and is provided with three current coils 108, 108a, and 108b, and three potential coils 109, 109a, and 109b. Potential is supplied from a low voltage potential bus 110 which is connected through a pair of potential transformers 111 to the primary circuit. The potential coils are delta connected by conductors 112 and 113 to the potential bus 110. Three current transformers 114 are placed in feeder 101 and three current transformers 115 are placed in feeder 102, these current transformers being differentially connected through conductors 116, 117, 118, and 119 in the usual manner, conductor 119 being grounded at 120 as shown. One end of current coil 108b is connected through conductor 121 to conductor 117, and the opposite end of this current coil is connected by conductor 122 to one of the contacts 123 of relay 124. From this contact, the circuit is through the operating coil 125 and then through conductor 126 to a tripping reactor 127, then through conductor 128, conductor 129, and back to conductor 119, which is the Y point of the differentially connected current transformer.

Current coil 108a is connected at one end by conductor 130 to conductor 116. From the other end of this current coil a conductor 131 connects to conductor 119.

Current coil 108 is connected at one end by conductor 132 to conductor 118, and the other end of this current coil is connected by conductor 133 to one end of an operating coil 134 of a relay 135 and thence from the other end of the operating coil to one of the contacts 136 of the relay, thence to the tripping reactor 137 which is connected to conductor 129.

The lowermost contacts of contacts 106 and 107 of the differential relay are interconnected by a conductor 138, and thence through conductor 139 to conductor 140, which interconnects the other contacts of relay 124 and relay 135.

The trip coil of switch A at the supply end of feeder 101 has one terminal connected through conductor 141 to the end of the tripping reactor 137 that is connected to conductor 129. The other end of this tripping coil is connected through conductor 142 to the uppermost of contacts 106.

The tripping coil 84 of switch A at the supply end of feeder 102 is similarly connected by conductor 143 to the terminal of the tripping reactor 127 that is connected to conductor 128. The other terminal of this trip coil is connected through conductor 144 to the uppermost of the contacts 107.

At the delivery ends of each of the parallel feeders, a switch A is inserted, and each of these switches is arranged for tripping upon reverse power. For this purpose there is shown a single phase reverse power relay 145, and it is to be understood that this relay may, if desired, be arranged for three phase operation. This relay has a current coil 146 which is connected at one end through conductor 147 to a current transformer 148, thence through conductor 149 to a ground connection 150, and thence to one end of a tripping reactor 151, the other end of this reactor being connected through conductor 152 to one of the contacts 153 of a relay 154. This contact is connected to the operating coil 155 of the relay, and thence through conductor 156 back to the other terminal of the reverse power current coil 146.

A potential coil 157 of the reverse power relay has one end connected through conductor 158 to the secondary of a potential transformer 159. The other terminal on the potential transformer is connected through conductor 160 to the other terminal of potential coil 157. A pair of contacts 161 are provided for the reverse power relay and arranged to close upon a reversal of power. One of these contacts is connected through a conductor 162 to the tripping coil 84 of the switch A at the delivery end of feeder 101. The other end of the trip coil is connected to conductor 149a. The other contact of contacts 161 is connected through a conductor 163 to the other contact of relay 154. The connections for the similarly mounted switch A and auxiliary devices in feeder 102 is the same as has just been described in connection with the switch at the delivery end of feder 101. It is therefore deemed not necessary to repeat the description in the case of the switch for feeder 102.

Since the reverse power and differential tripping relay scheme using tripping reactors is well known in the art and fully understood, it is not deemed necessary to describe the operation of the respective relays, etc.

In connection with the operation of these relays in selecting a feeder which is short circuited and in isolating that feeder, it will be presumed that there is a short circuit somewhere on the feeder 101 between the switches A—A at the ends of the feeder. Current flow in this feeder will be towards the short circuit with a result that the current flowing through the switch A at the delivery end of the feeder will be reversed. This reversal of current will cause the reverse power relay to close its contacts and place the tripping coil 84 across the tripping reactor 151. The solenoid of switch A will then be picked up and maintained up so long as current flows. Simultaneously with the pre-setting of switch A at the delivery end of the feeder, switch A at the supply end will also be pre-set by virtue of the fact that current transformers 114 carry greater current than the current transformers 115 of the normal operating feeder. The increase of current in current transformers 114 will cause the differential relay to close its contacts 106 to pick up relay 135 and connect the tripping coil 84 of the switch A across tripping reactor 137. So long as tripping coil 84 is energized, this switch A will not trip out, but will be merely pre-set.

It will be noticed that switches A in feeder 101 are now pre-set, and that as a result of the short circuit, the main circuit breaker 75 will be tripped due to overload. As soon as circuit breaker 75 trips, switches A in feeder 101 will trip to disconnect the faulty section.

Since switches A—A in feeder 102 were not pre-set, due to the short circuit in feeder 101, these switches remain closed. It will, therefore, be evident that circuit breaker 75 may now be re-closed, either manually, electrically, or automatically by means of automatic re-closing equipment, depending upon the particular installation, to re-establish service through feeder 102, which has not been tripped. If the short circuit had been on feeder 102, switches A—A of this feeder would have been pre-set and tripped out, and re-closure of the main circuit breaker 75 would re-establish service through feeder 101.

Referring to Figure 7, there is shown a distribution system in which the primary feeder is composed of a plurality of sections 78, 164, 165 and 166, the three last sections being shown as underground cables. Each section is connected to a low voltage network in the form of a loop 167, through a step-down transformer 168, conductor 169, and a low voltage switch B. Since each section of the primary loop is arranged for individually cutting out, and cooperates with the switch B in the low voltage circuit of the transformer connected to that section, it is thought that it will be sufficient to describe the invention in connection with section 165.

As shown in Figure 7, the switches A—A at the ends of the section 165 have their trip coils 84 connected to conductors 82 and 83 of the interconnections between current transformers 80 and 81 disposed at the ends of sections 165. The switch A, which is located adjacent the interconnection between section 165 and the low voltage utilization network 167, is provided with auxiliary contacts 170 which are arranged to be closed when the switch is closed and open when the switch is open. The purpose of these contacts will be explained in connection with the operation of switch B.

In order to prevent feed back from the low voltage network when a particular section is cut out, it is necessary to arrange switch B so that it will open when the low voltage network is de-energized, and close when the low voltage circuit is energized from the section with which switch B is associated. To accomplish this purpose, there is schematically shown a control relay 171 having an operating coil 172 and normally open contacts 173. This relay is preferably made time delay opening and instantaneous closing. The switch B is provided with a trip coil 174 and a low voltage release latch 175 which is normally actuated by a spring 176 to unlatched position. The switch B is provided with a closing coil 177 and auxiliary contacts 178 which are arranged to be open when switch B is closed, and closed when switch B is open.

The tripping coil or low voltage release coil 174 is connected through a conductor 179, through the contacts 170 on the auxiliary switch on switch A, and thence by conductor 180 to the low voltage connection from the step-down transformer 168 to the low voltage network 167. The other side of the release coil 174 is grounded to complete the circuit with the secondary of the step-down transformer.

The circuit for the control relay coil 172 is from conductor 169 to one of the contacts 173 of the control relay and thence through the operating coil 172, through conductor 181 to contacts 178, thence through conductor 182 to ground.

The circuit for the closing coil of switch B is from the other of the contacts 173 of the control relay through conductor 183 to the closing coil 177, and thence through conductor 184 to conductor 182.

Assuming, for the purpose of explaining the operation of the distribution system found in Figure 7, that a short circuit occurs on section 165, trip coils 84—84 of switches A—A will be pre-set. This short circuit will cause the main circuit breaker 75 to trip out on overload and de-energize the primary loop, with the result that the pre-set switches A—A at the ends of section 165 will trip out. The switches A of the other sections will remain closed.

Simultaneously with the tripping of the pre-set switches A—A, the low voltage release coil 174 of switch B will be de-energized and the latch 175 will be actuated by spring 176 so as to release contacts of switch B, which will then open. Opening of switch B closes auxiliary contacts 178, and opening of the associated switch A will open auxiliary contacts 170. The main circuit breaker 75 may then be reclosed to energize the low voltage network 167 through the remaining good sections.

As soon as faulty section 165 has been repaired, switches A—A at the ends thereof may be reclosed to put this section into service. Switches A—A being reclosed, the transformer 168 is energized, and the low voltage release coil 174 will have its circuit closed through auxiliary contacts 170, so that when switch B automatically closes, it will latch in closed position.

Voltage from the secondary side of the step-down transformer 168 is applied to the operating coil 172 of relay 171, which closes its contacts and connects the closing coil 177 of switch B to the low voltage side of the transformer 168. As soon as the switch B closes, it opens its auxiliary contacts 178 to disconnect the coil 172 of the control relay, whereupon after a brief time delay, the control relay opens its contacts to disconnect the closing coil of switch B. It is to be readily understood that in cases where the secondary voltage of the step-down transformer is too high for operating the closing coil of relay 171 and closing coil of switch B and the low voltage release coil 174, a separate potential transformer may be used.

From the foregoing description, it will be apparent that this invention provides a novel switch whereby a novel system of distribution may be effected, at a very economical cost; a distribution system wherein sections, feeders, and the like may be isolated without the necessity of providing expensive circuit breakers which must have sufficient interrupting capacity to interrupt the fault current; switching means having parts arranged to pre-set the switch and delay opening of the switch contacts until after the circuit in which the switch is installed has been de-energized elsewhere.

But, it is of course to be understood that, although we have described in detail the several embodiments of our invention, the invention is not to be thus limited, but only insofar as defined by the scope and spirit of the appended claims.

We claim as our invention:

1. In a distribution system having a supply circuit connected through a circuit breaker to a plurality of feeders connected to a utilization circuit, and means to automatically open said breaker under abnormal conditions; means for isolating one or more of said feeders relative to the supply circuit and utilization circuit upon the occurrence of abnormal conditions therein, said means comprising switches at the supply and delivery ends of each feeder, current transformers at said switches, the transformers at one end of a feeder being differentially connected to the transformers at the other end thereof, means connected to said transformers operative upon the occurrence of an abnormal condition in a feeder to pre-set the switches of that feeder and subsequently open only the switches of that feeder, after the circuit breaker in the supply circuit has opened due to the abnormal condition, whereupon the circuit breaker may be again closed to energize the utilization circuit through the un-isolated feeders.

2. A distribution system comprising a supply circuit, a utilization circuit, a plurality of feeders connecting the supply circuit to the utilization circuit, a circuit breaker in the supply circuit, means for opening said breaker on flow of abnormal current, switches in each feeder for respectively isolating the same upon the occurrence of a short circuit therein and subsequently to the opening of the circuit breaker, and means for pre-selecting the switches to be opened, whereupon the circuit breaker may be reclosed to energize the utilization circuit through the feeders which have not been isolated.

3. A distribution system comprising a supply circuit connected through a circuit breaker to parallel feeders, means for opening said breaker in response to an abnormal condition, means to selectively isolate one of said feeders upon the occurrence of abnormal conditions therein subsequently to the opening of the circuit breaker due to the abnormal condition, said means including switches respectively disposed at the supply ends of the feeders, other switches respectively disposed at the delivery ends of the feeders, means to selectively pre-set the switches of the feeder having the abnormal conditions therein, and means operative in response to the opening of the circuit breaker, for causing the pre-set switches to open, whereby the circuit breaker may be reclosed to energize the remaining feeders.

4. A distribution system comprising a supply circuit connected through a circuit breaker to parallel feeders, means for opening said breaker in response to an overload, means to selectively isolate one of the feeders upon the occurrence of a short circuit therein subsequently to the opening of the circuit breaker, said means including switches respectively disposed at the supply ends of the feeders, other switches respectively disposed at the delivery ends of the feeders, means to selectively pre-set the first named switches of the short circuited feeder, means to pre-set the second named switch of the selected feeder, and means operative subsequently to the opening of the circuit breaker to trip the pre-set switches, whereby the circuit breaker may be reclosed to energize the remaining feeders.

5. A distribution system comprising a supply circuit connected through a circuit breaker to parallel feeders, means for opening said breaker in response to an overload, means to selectively isolate one of the feeders upon the occurrence of a short circuit therein subsequently to the opening of the circuit breaker, said means including switches respectively disposed at the supply ends of the feeders, other switches respectively disposed at the delivery ends of the feeders, differential relay means operative to selectively pre-set the first named switch of the short circuited feeder, reverse power relay means operative to pre-set the second named switch of the short circuited feeder, and means responsive to the de-energization of said feeders for tripping the pre-set switches, after which the circuit breaker may be reclosed to energize the remaining feeders.

6. A distribution system comprising a source of supply connected to a primary loop composed of a plurality of sections, a circuit breaker in said connection, means for opening said breaker on the occurrence of abnormal conditions, a utilization circuit in the form of a network, feeders respectively connecting each section of the primary loop to the utilization circuit, switches respectively disposed in the feeders arranged to open when its associated feeder is de-energized, switches interconnecting the sections of the primary loop, means to pre-set the switches of a given section upon the occurrence of an abnormal condition in that section, and means for tripping the pre-set switches when the circuit breaker is opened, after which the circuit breaker may be reclosed to feed the utilization circuit through the remaining sections.

7. A distribution system comprising a source of supply connected to a primary loop composed of a plurality of disconnectible sections, an overload trip circuit breaker in said connection, a utilization network circuit, feeders respectively connecting the sections of the primary loop to the utilization circuit, feeder switches each arranged to open upon the disconnection of its associated primary section relative to the loop and close upon the reconnection thereof, sectionalizing switches interconnecting the sections of the primary loop, means associated with each section responsive to a short circuit thereon and operative to pre-set the sectionalizing switches associated therewith, and means to trip the pre-set switches to isolate the short circuited section when the primary loop is de-energized by the tripping of the circuit breaker, whereupon the circuit breaker may be reclosed to energize the utilization circuit through the sections which have not been isolated.

8. A distribution system comprising a source of supply connected through a circuit breaker to a primary loop circuit composed of a plurality of interconnected sections, means for opening the circuit breaker in response to an abnormal condition in said loop, feeders respectively connecting the primary sections to the utilization network circuit, and means operative to selectively disconnect any section and its associated feeder upon the occurrence of abnormal conditions in that section, and means operative to delay the disconnection of the selected section and its feeder until the supply circuit breaker has opened due to said abnormal conditions.

9. In a distribution system having a sectionalized loop feeder circuit fed from a supply through a circuit breaker, and means for opening the breaker upon the occurrence of abnormal conditions in the loop; sectionalizing switches interconnecting the sections of the loop, means selective to trip only the switches of a section containing a fault, and means to delay the opening of the switches associated with that section until the circuit breaker has opened, whereupon the breaker may be reclosed to energize the remaining sections.

10. In a distribution system, a high voltage feeder connected to a source of supply through a circuit breaker, means to trip open said breaker upon the occurrence of an abnormal condition on the feeder, a low voltage utilization circuit connected through a step-down transformer to said feeder, means to automatically disconnect said feeder at its supply and delivery ends upon the occurrence of an abnormal condition therein and after the tripping of the circuit breaker, a switch on the low voltage side of the transformer, and means for automatically tripping the same when the feeder is de-energized and automatically closing the same when the feeder is energized.

11. In a distribution system including a loop formed by a plurality of interconnected sections fed from a supply circuit through a circuit breaker, and means to open said breaker on the occurrence of abnormal conditions in the loop; means for isolating one or more of said sections relative to the supply circuit upon the occurrence of abnormal conditions therein, said means comprising switches at the ends of the respective sections, current transformers at said switches, the transformers at one end of each section being differentially connected with the transformers at the other end of that section, and means in each section connected to the current transformers of that section and operative upon the occurrence of the abnormal condition therein to pre-set the switches of that section and subsequently open the switches of the abnormal section, after the circuit breaker in the supply circuit has opened due to the abnormal condition, whereupon the circuit breaker may again be closed to energize the normal sections.

12. In a distribution system, a supply circuit connected to a feeder through a circuit breaker, means to open said breaker in response to an abnormal condition in the feeder, a power transformer in the feeder, a switch on the primary side of the transformer, a switch on the secondary side of the transformer, current transformers at said switches, the current transformers at one switch being differentially connected to the transformers at the other switch, and means connected to the current transformers operative upon the occurrence of abnormal conditions in the power transformer or its primary or secondary connections to pre-set the switches and subsequently trip open the switches after the circuit breaker in the supply circuit has opened.

13. A distribution system comprising a supply circuit adapted to feed a sectionalizable loop, a switch in the supply circuit, means for tripping said switch upon the occurrence of a fault in said loop, and means including sectionalizing switches for disconnecting a section of said loop, only when the fault occurs in said section, said means being responsive to the de-energization of said loop.

14. A distribution system comprising a supply circuit adapted to feed a loop having a disconnectable section, a switch at each end of said section, a circuit breaker in the supply connection to said loop, means for opening said breaker in response to a fault in the loop, whereby the loop including said section is de-energized, and means to open said switches in response to the de-energization of the loop only when the fault has occurred in said section.

15. A distribution system comprising a supply circuit adapted to feed a loop having a disconnectable section, a circuit breaker of relatively high interrupting capacity in the supply circuit connection to said loop, switches of relatively low interrupting capacity at the respective ends of the section for connecting and disconnecting the section relative to the balance of the loop, means for tripping the circuit breaker upon the occurrence of a fault in said loop, means selective as to loop faults occurring outside of said section and faults occurring in said section, and means depending upon said selection for opening said switches when the loop is de-energized.

16. A distribution system comprising a supply circuit adapted to feed a loop having a disconnectable section, a circuit breaker of relatively high interrupting capacity in the supply circuit connection to said loop, switches of relatively low interrupting capacity at the respective ends of the section for connecting and disconnecting the section relative to the balance of the loop, means for tripping the circuit breaker upon the occurrence of a fault in said loop, and means for pre-setting said switches in the event current flows through them in opposite directions, said pre-set switches being arranged to trip in response to the de-energization of said loop by the tripping of said circuit breaker.

17. In a distribution system having a supply circuit connected by a plurality of individual feeders to a utilization circuit, means for selectively isolating any one of the feeders relative to the supply circuit and utilization circuit upon the occurrence of a fault in the feeder to be isolated, said means comprising a circuit breaker of relatively high interrupting capacity in the supply circuit adapted to trip in response to the occurrence of said fault, switches of relatively low interrupting capacity at the supply and delivery ends of each of said feeders, means selectively operable to pre-set the switches at the supply and delivery ends of the feeder containing the fault, and means operative to trip only the pre-set switches in response to the de-energization of the feeders due to the opening of said circuit breaker.

18. In a distribution system having a supply circuit connected by a plurality of individual feeders to a utilization circuit, means for selectively isolating any one of the feeders relative to the supply circuit and utilization circuit upon the occurrence of a fault in the feeder to be isolated, said means comprising a circuit breaker of relatively high interrupting capacity in the supply circuit adapted to trip in response to the occurrence of said fault, switches of relatively low interrupting capacity at the supply and delivery ends of each of said feeders, means selectively operable to pre-set the switch at the supply end of the feeder containing the fault, means selectively operable to pre-set the switch at the delivery end of the feeder containing the fault, and means operative to trip only the pre-set switches in response to the de-energization of the feeders due to the opening of said circuit breaker.

19. In a distribution system having a supply circuit connected by a plurality of individual feeders to a utilization circuit, means for selectively isolating any one of the feeders relative to the supply circuit and utilization circuit upon the occurrence of a fault in the feeder to be isolated, said means comprising a circuit breaker of relatively high interrupting capacity in the supply circuit adapted to trip in response to the occurrence of said fault, switches of relatively low interrupting capacity at the supply and delivery ends of each of said feeders, means selectively operable to pre-set the switch at the supply end of the feeder containing the fault, means operable upon a reverse power condition at the switch at the delivery end of the feeder containing the fault for pre-setting this switch, and means operative to trip only the pre-set switches in response to the de-energization of the feeders due to the opening of said circuit breaker.

JOSEPH J. SHOEMAKER.
HOWARD P. SEELYE.